(No Model.)

W. L. CHURCH & S. A. REEVE.
ICE MACHINE.

No. 529,341. Patented Nov. 13, 1894.

WITNESSES
H. Brown
W. F. McLeod

INVENTORS:
Wm Lee Church
S. A. Reeve
by Wright Brown Crosby
Attys

UNITED STATES PATENT OFFICE.

WILLIAM LEE CHURCH, OF NEWTON, AND SIDNEY A. REEVE, OF BOSTON, MASSACHUSETTS, ASSIGNORS TO THE WESTINGHOUSE, CHURCH, KERR & COMPANY, OF JERSEY CITY, NEW JERSEY, AND NEW YORK, N. Y.

ICE-MACHINE.

SPECIFICATION forming part of Letters Patent No. 529,341, dated November 13, 1894.

Application filed January 17, 1894. Serial No. 497,126. (No model.)

*To all whom it may concern:*

Be it known that we, WILLIAM LEE CHURCH, of Newton, in the county of Middlesex, and SIDNEY A. REEVE, of Boston, in the county of Suffolk, in the State of Massachusetts, have invented certain new and useful Improvements in Ice-Machines, of which the following is a specification.

This invention relates to that class of apparatus for artificial ice-making in which a freezing plate or bed is employed, located in a tank or receptacle for the sweet water to be frozen, and it depends primarily upon utilizing the relative conductivities of metal, water, ice, and a material of low conductivity, such as paraffine, to which ice in forming will not adhere, the ratios, of conductivity of said materials or elements being respectively eighty, one-half, and one-sixteenth, referred to ice as unity.

The invention has for its object, first, to limit the shape and size of the cake of ice by surrounding the ice-forming or generating surface with a marginal surface of non-conducting material on which the ice cannot form except by its own extension by heat transmitted through itself; and second, to provide a surface which imparts shape to the initially formed side of a cake of ice during the freezing process, and from which the cake of ice can be separated with the minimum expenditure of time.

The invention also has for its object to provide means whereby a cake of ice may be artificially formed in a tank or receptacle without adhering to the walls of said receptacle.

To these ends, the invention consists of the improvements which we will now proceed to describe and claim.

Figure 1:
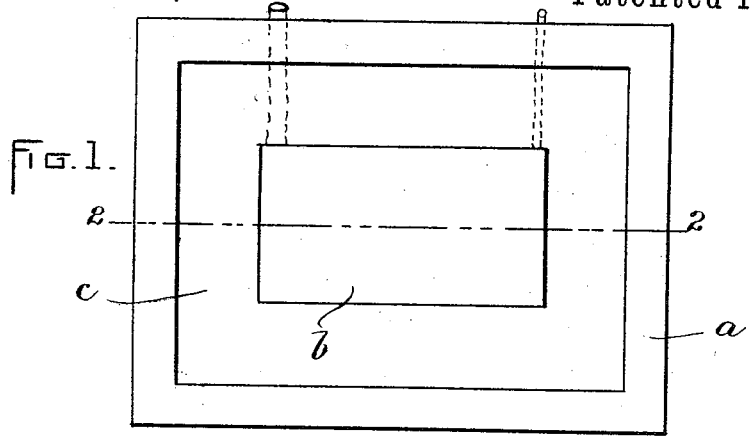
Figure 2:
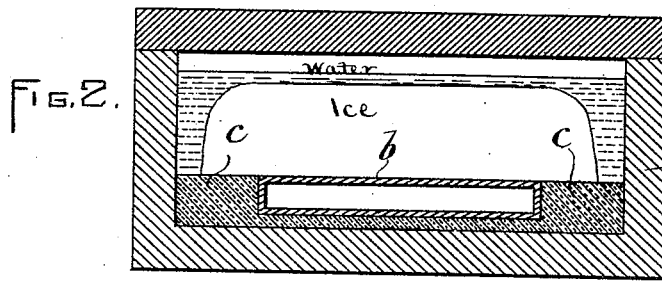
Figure 3:
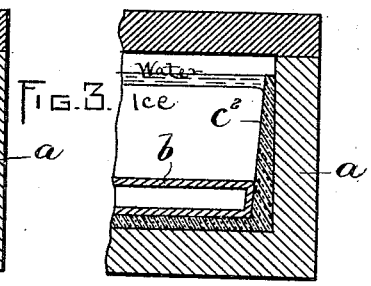
Figure 4:
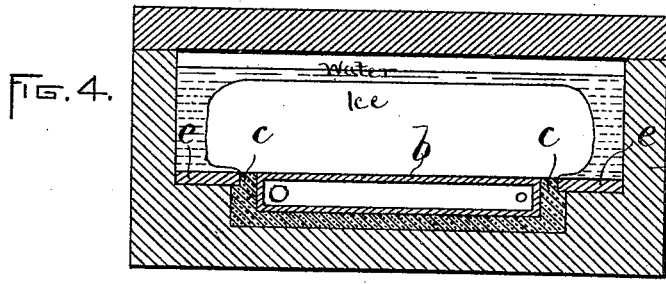
Figure 5:
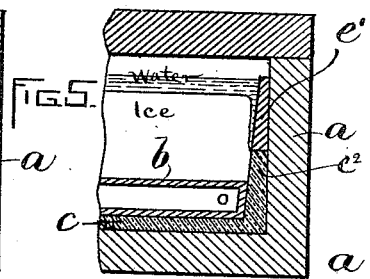
Figure 6:
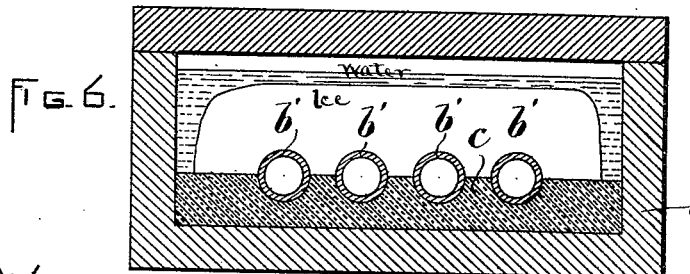
Figure 7:
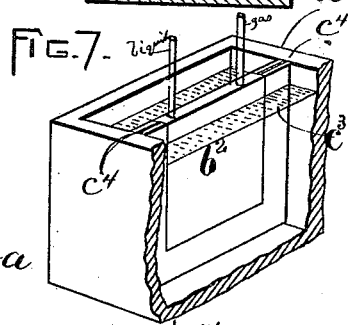

Of the accompanying drawings forming a part of this specification, Figure 1 represents a top plan view of an ice-making tank or receptacle embodying my invention. Fig. 2 represents a section on the line 2—2 of Fig. 1. Fig. 3 represents a modification of the arrangement shown in Fig. 2. Fig. 4 represents a view similar to Fig. 2, showing an additional element. Fig. 5 represents a sectional view, showing a modification of the construction shown in Fig. 4. Fig. 6 represents a sectional view showing a different construction of the ice-forming and ice-limiting section or surface. Fig. 7 represents a perspective sectional view of a modification.

The same letters of reference indicate the same parts in all figures.

In the drawings, $a$ represents a tank or reservoir adapted to hold a body of sweet water from which a cake of ice is to be artificially formed. In carrying out our invention, we provide said tank with a composite surface on which the freezing action commences, said surface shaping the initially formed side of the cake, and being composed in part of a conducting metal such as iron, which is in contact with or acted directly upon by the refrigerating agent, and in part of asphalt, or other material which is a non-conductor of heat and is non-adhesive to ice, and adhesive properties, to which the ice will not adhere, and over which it will freeze only to a limited extent, one object of our invention being to enable the ice to readily cleave or separate from a considerable part of the surface on which it is formed, without locking around it and without the necessity of waiting until said surface can be warmed sufficiently to melt the ice or cause its cleavage. In other words, we provide an ice-shaping bed or face comprising an ice-forming or generating section exposed to the action of a refrigerating agent, and an ice-limiting section of non-conducting material to which ice does not adhere, said limiting section co-operating with the generating section in shaping the initially formed side of the cake, but not in generating the ice, the ice accumulating on said limiting surface only by its own extension from the generating surface.

In Figs. 1, 2, 3, 4, and 5, we show the ice-forming or generating section as the top of a casing $b$, which is or may be of cast iron and is adapted to receive the refrigerating agent, said casing having suitable inlet and outlet pipes for a circulation of said agent. The ice-limiting section is shown as a wall or bed $c$, extending around the generating section and composed of paraffine or other material of comparatively low conductivity adapted to limit the ice frozen by the action of the refrigerating agent upon the contiguous generating section but incapable of freezing or adhering to said ice, so that after the cake of ice has been formed it may be separated from the face on which it was formed by slightly warming the generating section until the ice cleaves therefrom, when it will at once free itself from the non-conducting limiting section, and the cake will float.

In the construction shown in Fig. 6, the generating section is disposed in a number of tubes or conduits $b'$ through which the refrigerating agent may be circulated in any suitable way, said tubes being slightly separated and resting upon a bed $c'$ of non-conducting material which is non-adhesive to ice, the said material partly filling the spaces between the tubes so that it presents sections of non-adhesive surface substantially on the level of the center line of the tubes. This construction affords more area of generating surface than the flat construction previously described, and also concentrates the action of the refrigerating liquid on the freezing surface. In either case, the ice may be liberated with the minimum expenditure of time.

In Fig. 7 we show an adaptation of our invention to a vertically arranged freezing plate or generating section $b^2$, on which two cakes of ice may be formed simultaneously. In this case, the ice-limiting section $c^3$ does not necessarily extend across the upper edge of the plate, the latter being usually flush with or slightly above the surface of the water in the tank. The limiting section may conveniently be made of a wooden frame $c^4$, strong enough to support the generating section, the faces of the wooden frame being saturated or coated with the non-conducting and non-adhesive material $c^5$, and being substantially flush with the generating section; or the limiting section may be disposed on the sides of the tank at substantially right angles to the generating section, similar to the construction shown in Fig. 3.

In the application of our invention shown in Figs. 1, 2, and 3, we contemplate using the above-described improvements in connection with an improved method of separating the cake from the surface on which it is formed, said method consisting of freezing entirely from the bottom upwardly and arresting the freezing operation before the ice reaches the top of the body of water, so that sufficient water will remain above the cake to lift or float the same, thus raising it from the surface on which it was formed. It will be seen that the non-adhesive ice-limiting section enables the remaining water to act more quickly in raising the cake of ice than it otherwise could, the water working its way quickly between the surface of the limiting section and the ice.

We may further utilize the marginal face of non-adhesive material as a means for insulating, so to speak, a marginal metallic section $e$ from the generating section acted upon by the refrigerating agent. In Fig. 4 we show the marginal section $e$ as a metal frame which may be of copper, cast iron, or other good conducting metal, having its upper surface substantially flush with the surface presented by the casing $b$ and the surrounding limiting section $c$. The section $e$ is entirely separated from the casing $b$ by the non-conducting material, so that the casing can absorb little or no heat from the surface $e$, or in other words, cannot transmit cold to it. Said section $e$ extends outwardly a considerable distance in each direction, so that a considerable portion of it is in contact with the unfrozen sweet water. The section $e$ therefore absorbs sufficient heat from the water, which is always above the freezing point, to prevent the formation of ice upon it, the transmission of heat from the water to the ice through the section $e$ being many times more rapid than its absorption through the ice to the refrigerant, on account of the high relative conductivity of iron as compared with ice. The result is that the cake of ice, while it may accumulate or extend out upon the non-adhesive surface of the paraffine, will not form upon the surface $e$ except under a very low temperature, but will be separated therefrom by a narrow crevice, taking the general form shown exaggerated in Fig. 4. When the freezing is very rapid, in consequence of a very low temperature, while the ice may adhere to the surface $e$ during the freezing process, it will be liberated therefrom by the heat absorbed by the said surface from the unfrozen water after the freezing process has been arrested.

In Fig. 3 we show a modification of the construction shown in Fig. 2, the limiting section being a nearly vertical wall $c^2$ of paraffine extending around the walls of the tank.

In Fig. 5 we show a modification in which a marginal metallic section $e'$, which is insulated by the paraffine from the freezing bed, is disposed nearly vertically upon the sides of the tank $a$, the non-conducting margin of paraffine $c^2$ being similarly disposed. The action of the paraffine or insulated metal strip is the same as before, but a more exact form is given to the cake of ice by this arrangement.

In all cases, we prefer to separate the bottom of the freezing casing $b$ or the tubes $b'$ from the bottom of the tank by means of a layer of the paraffine or other comparatively non-conducting material as shown in the drawings. By so doing we concentrate the action of the refrigerant on the water for useful effect instead of dissipating it into the body of the tank. At the same time, we obviate the necessity of outside insulation at the bottom of the tank, the paraffine disposed as shown constituting a very compact insulation which reduces the height of the tank to the minimum, this being very desirable when the apparatus includes a vertical series of tanks.

It will be particularly noted that while for convenience we use the word paraffine, which material we have found to be very desirable, our invention equally includes resin, asphalt, or any similar material possessing the essentials of low thermal conductivity and non-adhesiveness to ice formed upon it.

It is obvious that the tank $a$ may be provided with an internal surface to which the ice will not adhere, by saturating the wood of which the tank is made with paraffine, or by lining the tank with wood or other suitable material saturated with paraffine, a limiting section being thus provided which is an equivalent of the constructions previously described.

The conduits $b'$ and the intermediate fillings constitute an ice-forming face which imparts deep grooves to the initially formed sides of the cake, so that when the cakes are piled one upon another in a storehouse said grooves will form ventilating air spaces between the courses of cakes whereby waste of the ice by melting is largely overcome, and the ice is kept in a firm, solid condition.

We claim—

1. An artificial ice-making apparatus comprising a tank for the water to be frozen and ice-shaping surfaces in said tank, composed in part of a conducting metal exposed to the action of a refrigerating agent and in part of a waterproof material of low conductivity to which ice does not adhere, said material presenting to the water a non-conducting surface which is non-adhesive to ice and gives form to portions of the cake without adhering thereto.

2. An artificial ice-making apparatus comprising a tank for the water to be frozen, and ice-shaping surfaces in said tank composed in part of a conducting metal exposed to the action of a refrigerating agent and in part of a water-proof material of low conductivity, said material extending from the acting surface of the bed beyond the limit to which ice formed on the bed extends, whereby the ice is prevented from coming in contact with surfaces to which it is adhesive.

3. An artificial ice-making apparatus comprising a tank for the water to be frozen, a horizontal ice-forming or generating bed at the bottom of said tank, and a mass of non-conducting and waterproof material in which the freezing bed is embedded, said material being non-adhesive to ice and covering the bottom and edges but not the top of the freezing bed.

4. A shaping bed or plate for artificial ice making, comprising a main or central section of conducting metal exposed to the action of a refrigerating agent, an outer section or area of conducting metal exposed to contact with the unfrozen water, and an intermediate section of non-conducting material to which ice does not adhere, said intermediate section insulating the outer section from the said main section and from the refrigerating agent.

5. An ice-shaping bed or plate composed of a series of tubes or conduits of conducting metal adapted to contain a refrigerating agent, and intermediate fillings of non-conducting material to which ice does not adhere, said fillings preventing the locking of the ice around the tubes, and co-operating with the exposed surfaces of the conduits in shaping one side of a cake of ice which is generated upon said conduits.

In testimony whereof we have signed our names to this specification, in the presence of two subscribing witnesses, this 15th day of January, A. D. 1894.

WM. LEE CHURCH.
SIDNEY A. REEVE.

Witnesses:
HENRY J. CONANT,
WILLIAM R. RONEY.